United States Patent [19]

Janke et al.

[11] Patent Number: 4,739,593

[45] Date of Patent: Apr. 26, 1988

[54] TERRACE GLASS ENCLOSURE

[76] Inventors: Bernhard Janke, Lohestrasse 5, Bayreuth, D-3580; Ludwig Drechsel, Friedrichstrasse 36, Bayreuth, D-8580, both of Fed. Rep. of Germany

[21] Appl. No.: 935,313

[22] PCT Filed: Mar. 6, 1986

[86] PCT No.: PCT/EP86/00118
 § 371 Date: Oct. 24, 1986
 § 102(e) Date: Oct. 24, 1986

[87] PCT Pub. No.: WO86/05066
 PCT Pub. Date: Sep. 12, 1986

[30] Foreign Application Priority Data

Mar. 8, 1985 [DE] Fed. Rep. of Germany ....... 3508395

[51] Int. Cl.$^4$ .......................... A01G 9/14; E04B 7/16; E05C 13/14
[52] U.S. Cl. ........................................... 52/64; 52/86; 292/345; 292/DIG. 46; 47/17
[58] Field of Search ................... 52/66, 64, 86; 47/17; 292/DIG. 46, 345

[56] References Cited

U.S. PATENT DOCUMENTS

| 2,094,801 | 10/1937 | Mass | 52/64 |
| 2,728,115 | 12/1955 | Cornelius | 52/86 |
| 3,766,691 | 10/1973 | Ray | 52/66 |
| 4,018,213 | 4/1977 | Mann | 47/17 |
| 4,133,148 | 1/1979 | Swenumson | 52/64 |

FOREIGN PATENT DOCUMENTS

| 2228405 | 12/1973 | Fed. Rep. of Germany | 52/66 |
| 2445838 | 4/1976 | Fed. Rep. of Germany | 52/66 |

Primary Examiner—John E. Murtagh
Attorney, Agent, or Firm—Helfgott & Karas

[57] ABSTRACT

The terrace glasswork, which is particularly simple to adapt to building conditions, contains the following features: (a) It is made up of a vaulted roof, which is supported above on an existing wall and below on the terrace floor; as well as two gable parts. (b) The roof is made up along its length of several identical, glassed in arch components, the side frame parts of which can be joined and sealed to one another. Each of the latter has two movable glass panes (17, 20) guided so as to slide at different levels. (c) The gable parts are each made up of three gable components, namely of a square basic component (4) and two connecting components (5a, 6a) each of which to the arch components, and which connects together two right-angled frame sides of the basic component (4).

22 Claims, 8 Drawing Sheets

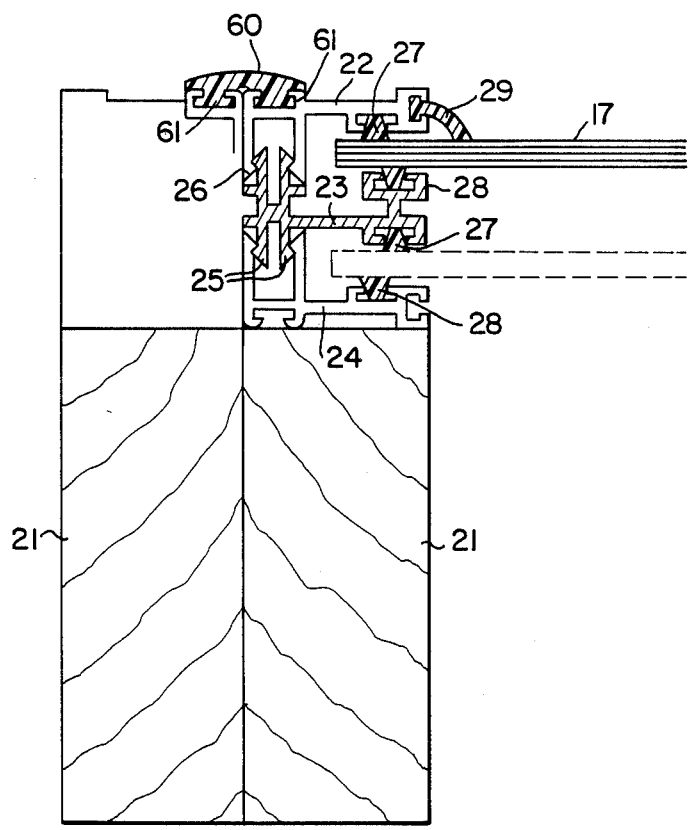

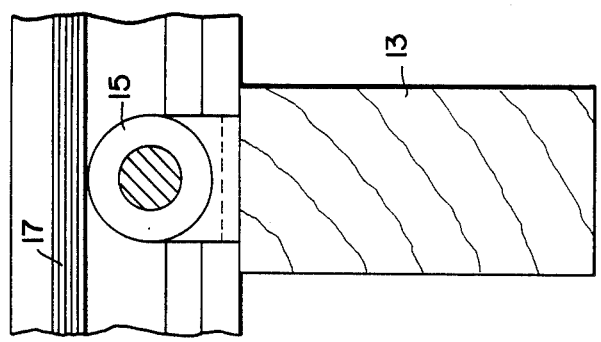
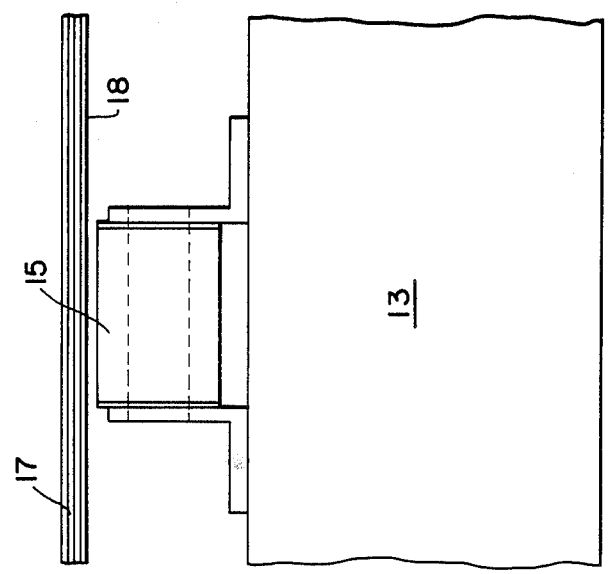

TERRACE GLASS ENCLOSURE

The invention relates to a terrace glass enclosure, which is formed essentially by a roof, which extends between a wall of the house and a terrace floor adjoining this wall. Such terrace enclosures, prefabricated from individual elements, easily installable and adaptable with respect to height and depth to the particular circumstances, have not previously been known.

In accordance with the inventive proposal, a terrace glass enclosure, which satisfies these concepts, has the characteristics (a) to (c) of claim 1.

According to these, the terrace glass enclosure comprises essentially a roof between arch elements forming wall and floor; depending on the length of the terrace glass enclosure, a convenient number of such arch elements can be positioned together, and connected with one another to form a seal at their lateral frame parts. The lateral frame parts advisably are one-piece, arch-shaped supports, for example, in the nature of so-called laminates.

The lateral frame parts are connected at their ends by appropriate cross frames into a closed frame. Profiled parts, which form the guides for the glass panes, are provided in or on this frame, each arch element having two glass panes, which mutually overlap, namely an outer glass pane, which is movably held in an outer guide, and an inner glass pane, which is somewhat shorter than the outer glass pane and which is held in an inner guide. To be able to use plane glass panes, these panes must not exceed a certain thickness, about 4 mm, as otherwise they cannot be shaped to correspond to the curvature of the arch elements.

Like the roof, the gable parts, that is, the walls of the terrace glass enclosure that close off the roof at the front, are assembled from prefabricated, individual gable elements. These comprise a square, basic element, which is set up on the terrace floor adjoining the existing wall of the building and the free corner of which supports the arch element assigned to it. The openings, which remain free between the square, basic element and the associated arch element, are closed off by two connecting elements in accordance with characteristic c) of claim 1.

Accordingly, the two connecting elements each have a frame arch; both frame arches together form an arch, which corresponds to the arch elements; the frame arches can form similar or dissimilar arch sections. In the event that the arch sections are similar, the two connecting elements are identical. In the event that the arch elements are dissimilar, the dimensions of the terrace glass enclosure differ in height and depth. Obviously, in the last mentioned case, the two dissimilar elements can be exchanged arbitrarily, so that a lesser depth corresponds to a greater height of the terrace glass enclosure or, conversely, that a greater depth corresponds to a lesser height of the terrace glass enclosure. Using three different connecting elements, it is thus possible to build terrace glass enclosure in three different heights or depths.

In order to brace this construction against lateral shear forces, that is, shear forces acting in the longitudinal direction of the terrace glass enclosure, provisions are made in a refinement of the invention so that transverse and/or diagonal struts are provided between the lateral frame parts of the arch elements in the region of their upper end sections.

These struts can function at the same time as support buffers or rollers, which are disposed closely below the outer pane for support, when this outer pane sags under the load of snow. Such support is advisable since, for reasons already given above, relatively thin glass panes must be used, which cannot withstand heavy loads of snow.

To simplify the manufacture especially of the arch elements, provisions are furthermore made so that the lateral frame parts are constructed linearly in each case in the region of their upper and lower end sections. Accordingly, from geometric considerations, it is advisable to have the lateral frame parts describe an arc of a circle in each case in the region between their upper and lower end sections, the radius of said circle being somewhat smaller than the diagonal of the basic element. An optimum configuration of the interior is thus achieved for a specified height and depth of the terrace glass enclosure.

For safety reasons, provisions are made so that the outer glass pane of the arch elements is longer than the inner one in such a manner, that a handle for the operation of the outer pane is released only when the inner pane has been pushed sufficiently far in the upwards direction. At the same time, this measure ensures that the inner pane is overlapped by the outer pane, so that rain water cannot penetrate.

Within the scope of the invention, special handles are provided for the adjustment of the two panes of glass. These handles are constructed not only so that they brace the panes themselves; they moreover fulfill some additional, fundamental safety requirements by having laterally projecting cams, which work together with stops on the frame parts. Only by shifting an operating element of these handles are the stops on the frames released by the cams, so that the glass pane may be shifted. In the starting position, the operating elements of the handles are always in a position in which the cams are obstructed by the stops under the action of the force of a spring. By these means, the panes, when pushed upwards, are prevented from sliding downwards inadvertently.

A special refinement of the handles and, more particularly, of their operating elements, arises out of the dependent claims 11 to 14.

The guides for the two glass panes preferably are formed from profile parts plugged one on top of the other, an outer and an inner profile being connected via an intermediate profile which, together with the respective outer or inner profile, forms a pane guide. To simplify manufacture, the outer profile may be identical in construction with the inner profile; the two profiles can be disposed in mirror-image arrangement and connected with one another via an intermediate profile of metal or plastic. By releasing the plug-in connection, the possibility if given of lifting off the outer profile in the upwards direction, so that the outer glass pane can easily be removed. By means of an appropriate plug-in connection the intermediate profile and the inner profile, the possibility is given of removing also the inner pane in the same manner.

Obviously, within the scope of the invention, connecting means are provided, which connect two adjacent, lateral frame parts of two adjoining arch elements to each other so as to form a seal.

The two connecting parts which, in addition to the square basic element, are required for each gable part, usually form separate gable elements; they may also, however, be constructed as a continuous frame arch, which is placed during the installation over the free corner of the square basic element.

In the following, an example of the operation of the invention is explained by means of the drawing.

FIG. 7 shows a section in the VII—VII plane of FIG. 2.

FIG. 13 shows a roller for supporting the outer pane.

FIG. 14 shows a side view corresponding to FIG. 13.

Figure 1:
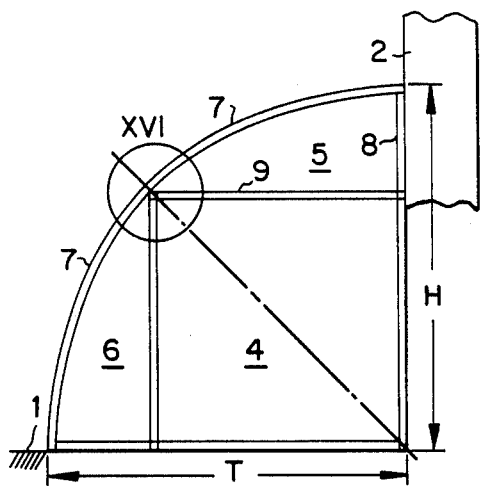
FIG. 1 shows a schematic gable view of the terrace glass enclosure.
Figure 2:
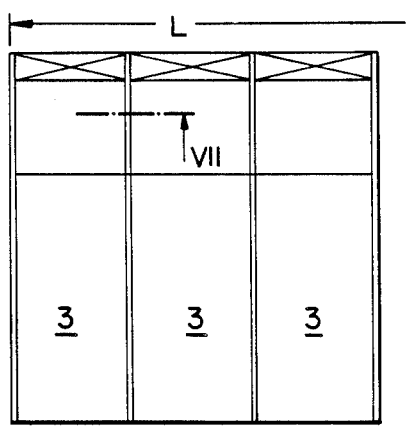
FIG. 2 shows a front elevation of the terrace glass enclosure.
Figure 3:
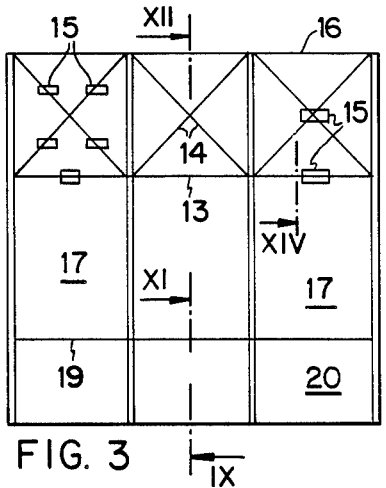
FIG. 3 shows a plan view of the terrace glass enclosure.

A terrace glass enclosure, corresponding to those shown in FIGS. 1 to 3, roofs in a terrace floor 1 over an area having a depth T and a length L. It extends upwards to a height H at an existing wall 2 of a building in such a manner, that several arch elements 3, arranged one behind the other in the longitudinal direction, form an arched roof, which is closed off at the two end faces in each case by gable parts, which are assembled in each case from three gable elements.

The gable elements comprise a square, basic element 4, an upper connecting element 5 and a lateral connecting element 6. Different heights and depths of the terrace glass enclosure can be formed, depending on the dimensioning of these connecting elements 5, 6.

Figure 4:
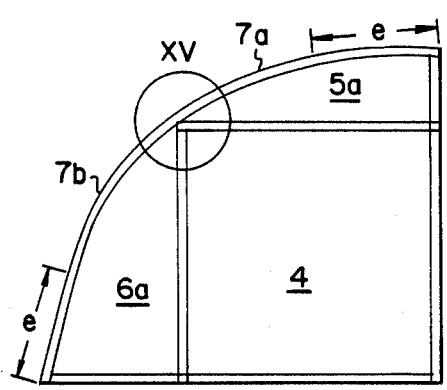
FIG. 4 shows a schematic view of a variation of the gable of the terrace glass enclosure.
Figure 5:
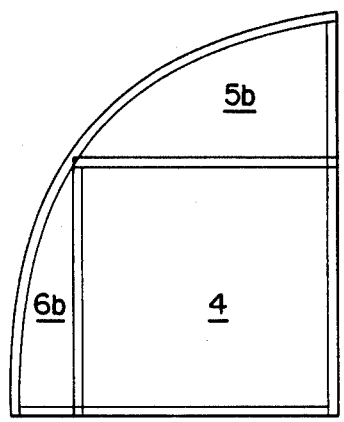
FIG. 5 shows a schematic view of a further variation of the gable of the terrace glass enclosure.

In FIG. 1, the two connecting elements 5, 6 are developed identically. In FIG. 4 on the other hand, the upper connecting element 5a is developed lower, the lateral connecting element 6a deeper. In FIG. 5, the connecting elements of FIG. 4 are exchanged, that is, the upper connecting element 5b of FIG. 5 corresponds to the lateral connecting element 6a of FIG. 4 and the lateral connecting element 6b of FIG. 5 corresponds to the upper connecting element 5a of FIG. 4.

Basically, it is of importance that, with three connecting elements of different sizes, namely the connecting element of FIG. 1 and the two connecting elements of FIGS. 4 and 5, a total of three different heights and depths of the terrace glass enclosure can thus be realized, the basic element 4 always remaining the same. Each connecting element 5, 5a, 5b or 6, 6a, 6b consists in each case of one frame arch and two thereon adjoining rectangular frame legs. The two frame arches 7a, 7b have at their outer ends in each case a linear section e. The same is true for the frame arch 7 of FIG. 1.

In the example of FIG. 1, the upper connecting element 5 comprises the frame arch 7, a vertical frame leg 8 and a horizontal frame leg 9, the length of which is identical with the length of one side of the basic element 4. It is self-evident that the connecting parts and the basic element 4 in each case form glass wall parts, which are bordered by a frame.

Instead of glass, a transparent or even an opaque plastic material may also come into consideration; this is so especially for the basic element 4.

Figure 16:
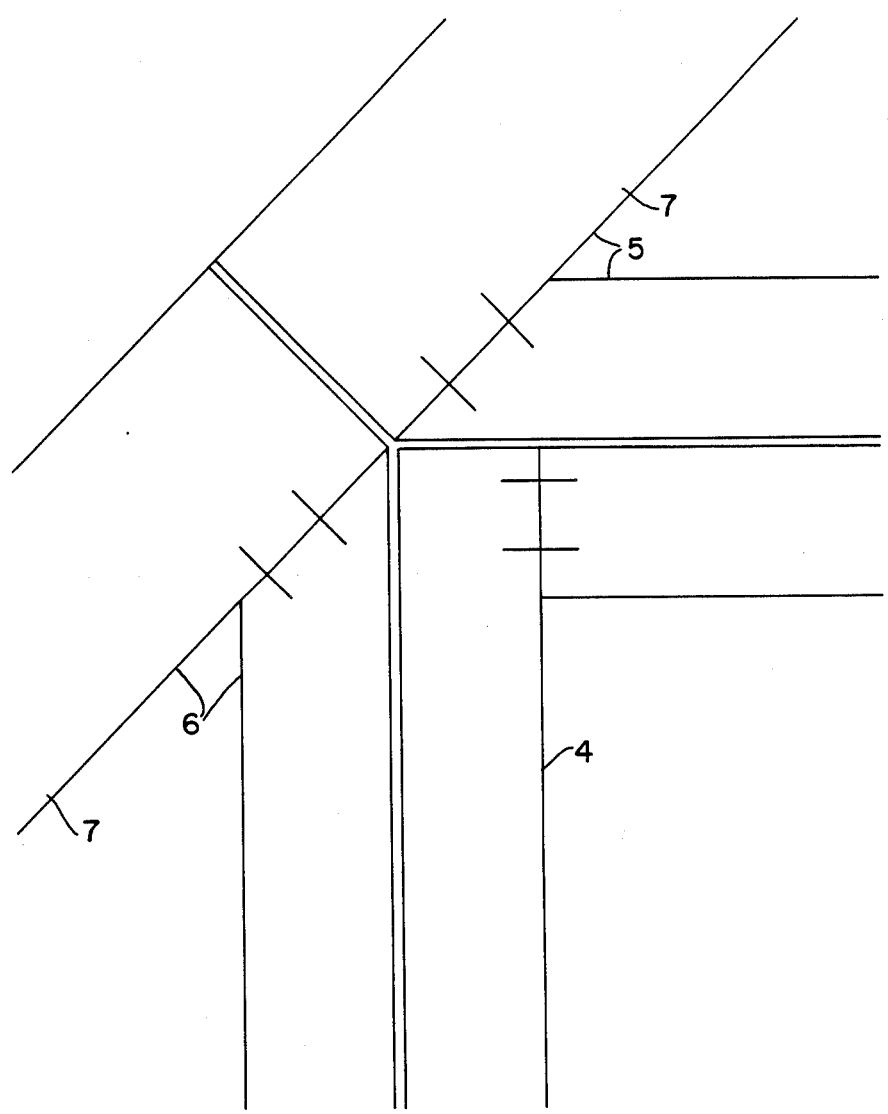
FIG. 16 shows a detail of the circles portion and denoted XVI in FIG. 1.

FIG. 16 shows, on an enlarged scale, the junction point between the two connecting parts and the basic element 4, the connecting parts 5, 6 being identical; the frame arches 7 of the connecting parts 5, 6 are inclined here at an angle of, for example, less than 45° to the vertical.

Figure 15:
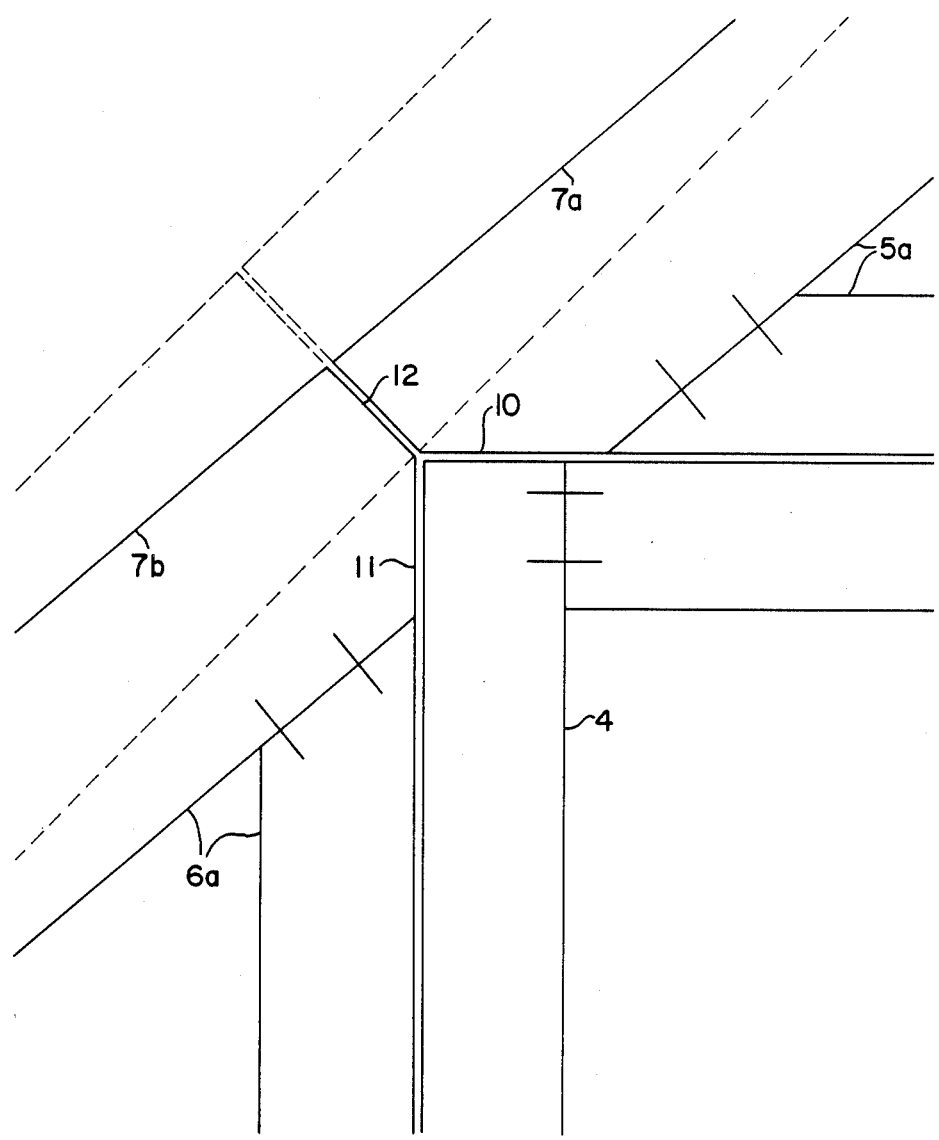
FIG. 15 shows a detail of the circled portion and denoted XV in FIG. 4.

The situation with regard to the gable part in FIG. 15 is similar to that shown in FIG. 4. The frame arches 7a, 7b have sloping sections 10, 11 here, that is, the corner of the square, basic element 4 extends slightly into the frame arch in the region of its joint 12. This slight correction of the geometry is required in order to ensure that, in those cases where the connecting parts 5a, 6a and 5b, 6b are dissimilar, the floor and the wall are connected to the frame arches 7a, 7b. The dash lines in FIG. 15 show the position of the frame arch in FIG. 16 for comparison purposes.

Figure 6:
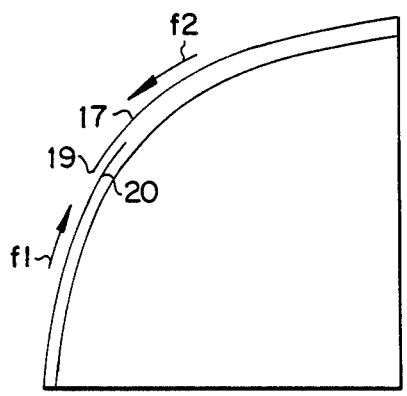
FIG. 6 shows a schematic vertical section through an arch element of the roof of a terrace glass enclosure.

FIGS. 2, 3 and 6 show some schematic views of the terrace glass enclosure. In FIG. 2, three arch elements 3, disposed side by side, can be recognized, the length L of the terrace glass enclosure being determined by the number of such side-by-side arch elements 3 used.

From the plan view of FIG. 3, it can be seen that the arch elements are braced in the region of the their upper end sections in the vicinity of the upper cross frame 16 by cross struts 13 and diagonal struts 14. These struts carry roller 15 at their upper side, different arrangements of such rollers 15 being conceivable. In the region of the left arch element, five rollers 15, which are distributed over the whole of the supporting surface, are provided. On the other hand, two supporting rollers 15 may also suffice, as shown within the right arch element of FIG. 3. FIGS. 13 and 14 show a supporting roller 15 along the sectional plane XIV—XIV of FIG. 3. The supporting roller 15 is mounted here on a cross strut 13 and, moreover, in such a manner that, when there is no load on the outer glass pane 17, there is only a small distance between the underside 18 and the supporting roller 15. If the outer pane is stressed by a snow load, it sags and finds support on roller 15, which preferably is covered by or consists of an elastic material.

In FIG. 3, only the lower edge 19 of the outer pane 17 is drawn for each arch element. In FIG. 6, on the other hand, it can be seen how the outer pane 17 and the inner pace 20 overlap. The two arrows f1, f2 indicate the directions in which the two panes 17, 20 may be shifted from the closed terrace glass enclosure drawn in FIG. 6.

FIG. 7 shows a cross section through two arch frames 21, which are connected to each other. Both consist of laminated wood, on which metal or plastic profiles are mounted for holding the two glass panes 17, 20. These profile parts are assembled from individual profiles, which are plugged together one on top of the other, namely, an outer profile 22, an intermediate profile 23 and an inner profile 24. The outer profile 22 and the inner profile 24 have the same cross sectional shape; they are merely disposed in mirror image fashion. The two profiles, which preferably consist of metal, are connected by an intermediate profile 23, which preferably consists of a plastic material. Elastic tabs 25 of the intermediate profile catch behind projections 26 on the inner walls of grooves, into which the tabs 25 penetrate. The two glass panes 17, 20 are guided in each case between an upper strip seal 27 and a lower strip seal 28, which in each case are held in appropriate grooves of the adjacent profiles. To further improve the sealing effect against penetration by rainwater, the outer profile 22 has a lateral sealing lip 29 as well, which is placed from above on the outer glass pane 17. The two adjacent frame arches 21 are connected at their outer periphery by means of a connecting ledge 60, which at the same time functions as a seal and which, at its underside, has projections 61, which are buttoned into corresponding grooves of the outer profiles 22 of the two frame arches.

Figure 9:
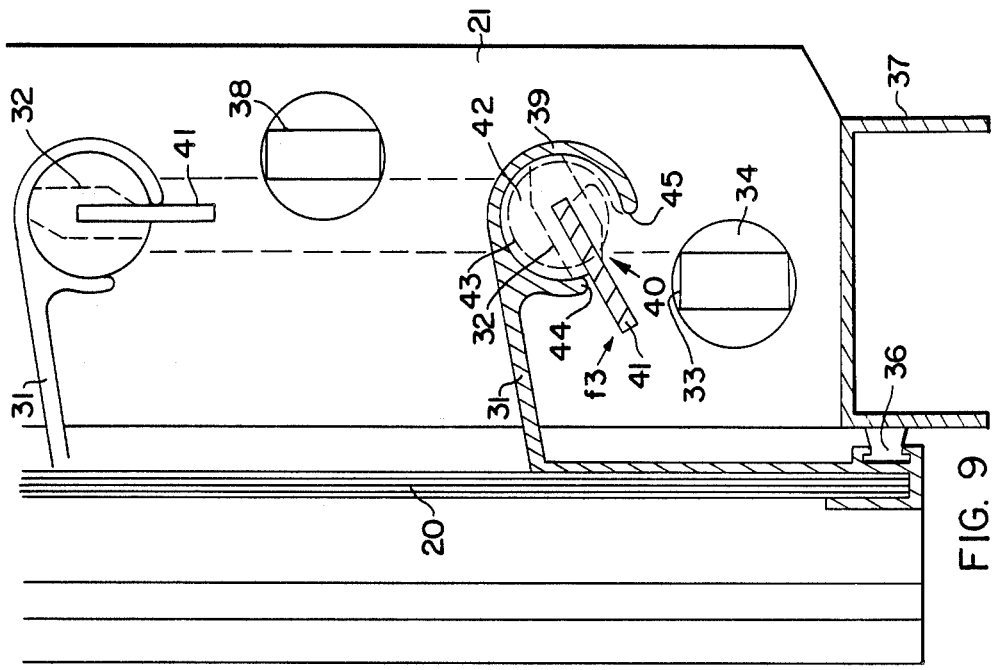
FIG. 9 shows a side view corresponding to FIG. 8.
Figure 8:
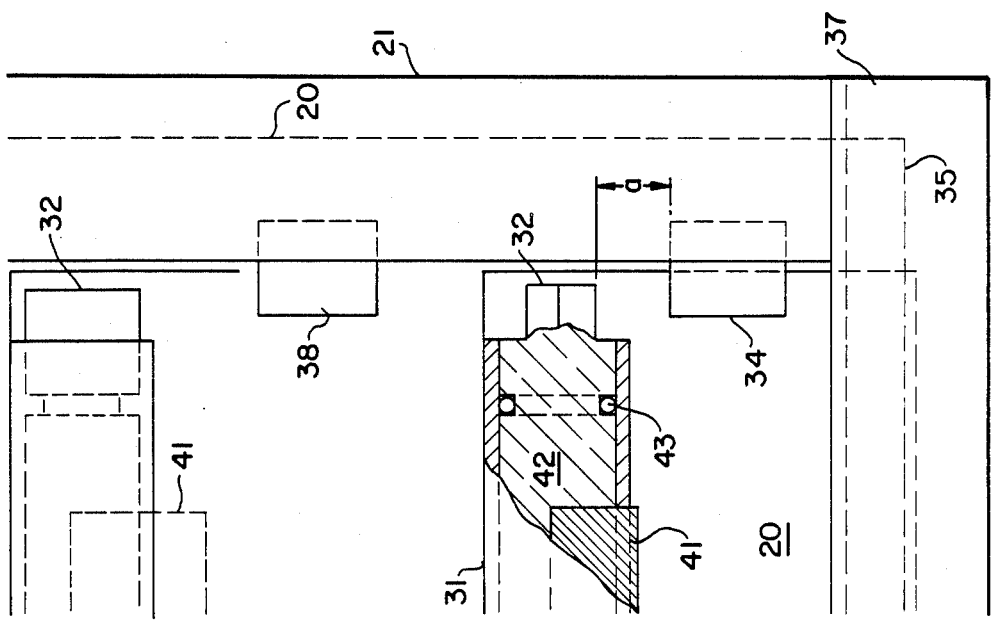
FIG. 8 shows a view of the handle ledge in the corner region of the inner pane.

FIGS. 8 and 9 (FIG. 9 corresponds to a section in the IX—IX plane of FIG. 3) show the lower right corner of the inner glass pane 20, which has reached a position that is a short distance "a" from a lower stop 34. A handle 31 has a laterally projecting cam 32 which, in the rotated position shown at the bottom in FIG. 9, drives against the the upper side 33 of the stop 34, which is fixed to the frame. The handle 31 is mounted on the inner side of the inner pane. The gap between the handle 31 and a base rail 37, which connects the two frame arches 21 of an arch element 3, are sealed towards the outside with a seal 36, which runs parallel to the end edge 35 of the inner pane 20. The base rail 37 forms the lower cross frame of each arch element.

Above the lower stop 34, which forms the lower stop, a further stop 38 is provided which would block the further lifting of the inner pane 20 at the handle 31 from its illustrated position. To circumvent this, an operating element 40, which is accommodated in the interior of the cylindrical housing 39 of the handle, is shifted owing to the fact that an operating ledge 41 is swivelled in the direction indicated by arrow f3, as a result of which the cam 32 assumes the position shown in the upper (alternative) representation of the handle ledge 31, in which the cam 32 can be moved past the stop 38. The operating element 40 accordingly comprises a cylindrical part 42, which is accommodated in the interior of the housing 39 of the handle 31 and at the end faces of which the cams 32 are formed and in which the operating ledge 41 is accommodated. By means of a spring 43, the cylindrical part 42 is tensioned against the housing 39 of the handle 31 in such a manner, that the operating ledge 41, in its starting position, is constantly pressed against the upper edge 44 of the opening of the housing 39 of the handle 31. Only on operating the operating element, that is, on raising the inner pane 20, is the operating ledge 41 swivelled in the direction of arrow f3, until it comes to rest against the lower edge 45 of the opening of the housing 39. This position is shown in the upper representation of the handle 31, which is provided merely for clarification (since in reality, of course, only a single handle, namely the cross-hatched handle, is provided).

Figure 10:
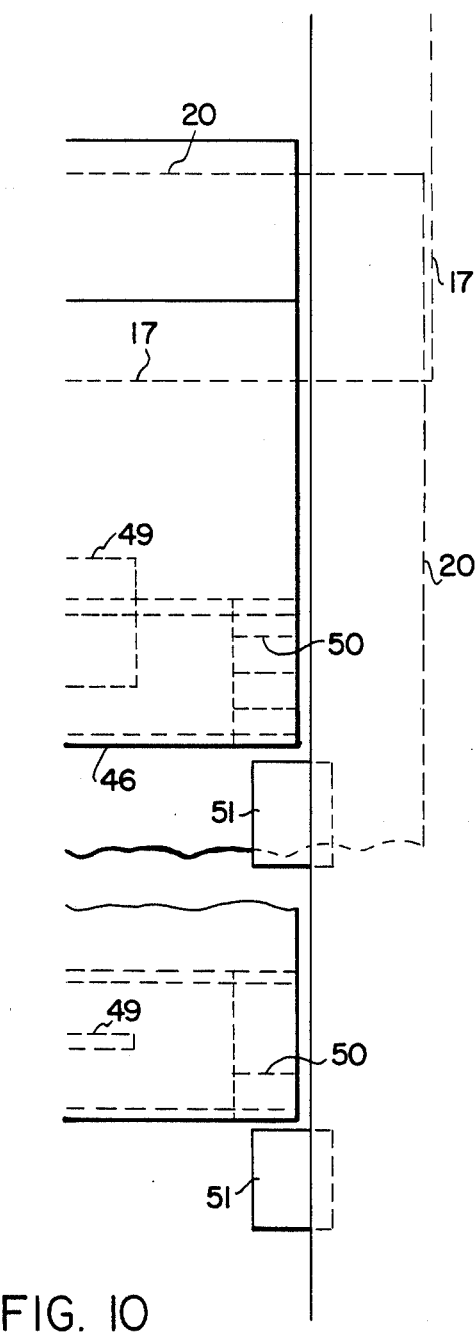
FIG. 10 shows a view of the handle ledge in the corner region of the outer pane.

FIG. 10 shows a view of the lower right corner of the outer pane 17, as seen from the outside. The handle 46 bordering the lower edge of the outer pane 17 and having a cylindrical housing 47, the cylindrical part 48 that can be rotated in the housing 47, the operating ledge 49 mounted on the housing 47, as well as the cam 50 that is integrally molded to the end of the cylindrical part, can be recognized. Moreover, two stops 51, which are fixed to the frame, are disposed one above the other. In the position of the operating element 51, shown at the top, the underside 52 of the cam 50, as the outer pane 17 moves downwards, strikes against the stop surface 53 of the stop 51, so that further movement of the pane 17 is blocked. This is of great importance for the safety of the terrace glass enclosure, because the inadvertent downwards sliding of a pane is precluded by such means.

In the lower, merely alternately drawn position of the operating element 51, the pane can be pulled downwards by pressing fingers from the outside towards the inside on the upper side of the operating ledge 49, which touches the lower edge 54 of the opening of the cylindrical housing 47 of the handle ledge 46. In this position, the cam 50 is swivelled into the vertical position, so that it can slide past stop 51.

As long as the inner pane 20 covers the handle 46 towards the inside, it is impossible to move the outer pane 17. It becomes possible to move the outer pane 17 only by pushing the inner pane 20 in an upwards direction until, as shown in the lower representation in FIG. 11, the operating ledge 49 becomes accessible. An unauthorized person can thus not move the outer pane 17 from the outside, as long as the inner pane 20 is in the lower stop position. The inner pane 20, in turn, can be operated only from the inside. At least as long as it is locked, there is no possibility of opening the glass enclosure from the outside.

Figure 11:
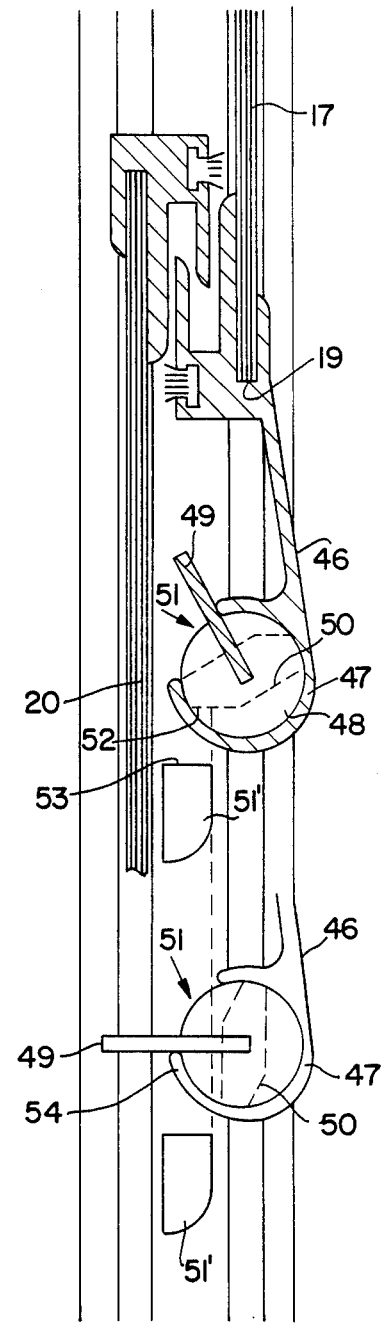
FIG. 11 shows a side view corresponding to FIG. 10.

The representation of FIGS. 10 and 11 correspond to a section in the plane XI of FIG. 3, that is, level with the lower ledge 19 of the outer pane 17. The outer pane 17 is in the upper stop position here, while the inner pane 20 is in the lower stop position.

Figure 12:
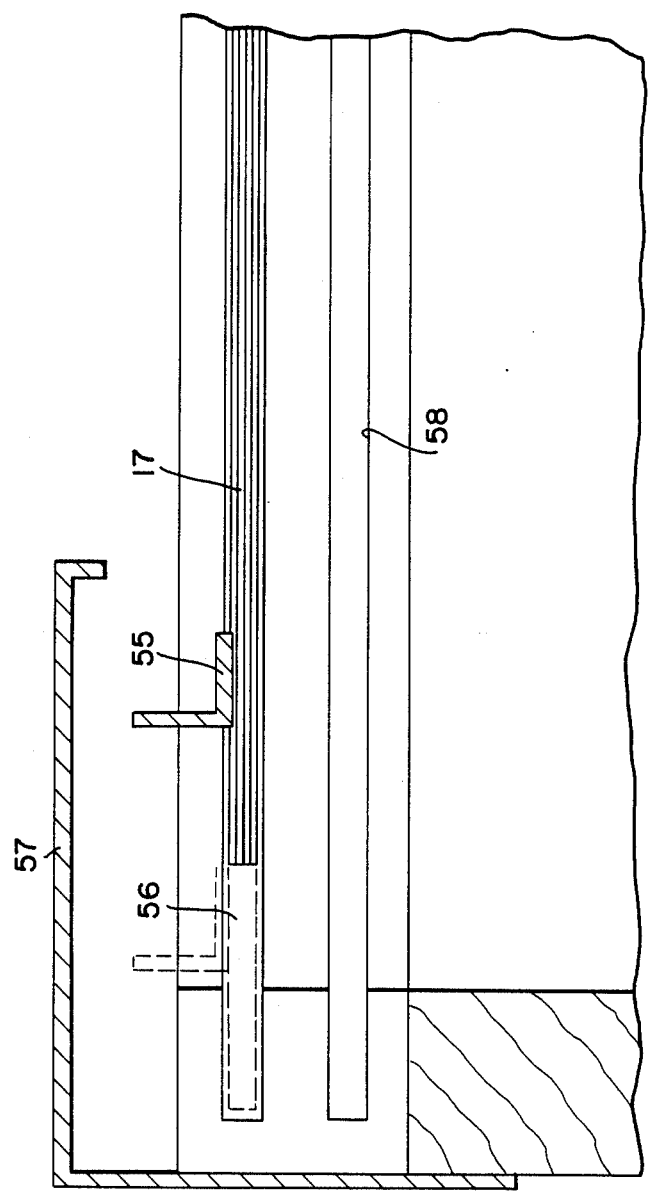
FIG. 12 shows a section in the XII—XII plane of FIG. 3.

FIG. 12 shows a section in the plane XII of FIG. 3. The outer pane 17 is close to its end position, which is drawn by the broken lines. At its outer side, it has a bracing angle profile 55, which extends transversely over the whole pane and, at the same time, represents a barrier against rising rainwater. In the position shown, the upper pane 17 unblocks a ventilation opening 56, which is covered above by an edge profile 57. The guide 58 for the inner pane can be recognized below the outer pane 17.

We claim:
1. Terrace glass enclosure comprising
   (a) an arched roof supported at its top by an existing wall and at its bottom by a terrace floor,
   (b) said roof being constituted of a plurality of similar arch elements having lateral frame parts adapted to movably guide two glass panes in different planes, said arched roof at its opposite sides being closed off by gable parts each comprising
   (c) three gable elements in turn comprising a rectangular basic element and two connecting elements, each connecting element comprising a frame arch shaped to correspond to the arch elements and two mutually perpendicular frame legs, one of which constitutes a leg of the rectangular basic element, said glass panes having handles at their lower ends, said handles having laterally projecting cams, which either engage or clear stops on the frame parts as a function of the operative condition of the handles.

2. Terrace glass enclosure as defined in claim 1, wherein the frame arch for each of the two connecting elements comprise similar or dissimilar arch sections.

3. Terrace glass enclosure as defined in claim 1, wherein struts are provided between the lateral frame parts in the upper regions thereof.

4. Terrace glass enclosures as defined in claim 1, wherein the lateral frame parts are shaped so as to have linear sections at their upper and lower regions.

5. Terrace glass enclosure as defined in claim 4, wherein the lateral frame parts between their upper and lower end regions prescribe an arc of a circle, the radius of which is smaller than a diagonal of the rectangular basic element comprising a rectangular basic element.

6. Terrace glass enclosure as defined in claim 1, wherein said two glass panes comprise an outer and an inner glass pane, the outer glass pane of the arch elements being longer than the inner pane, and a handle for operating the outer pane and being adapted to be released only when the inner pane is in a predetermined position above a closed position thereof.

7. Terrace glass enclosure as defined in claim 1, wherein the lateral frame parts include spaced apart superposed profile parts interconnected by an intermediate profile part, which acts as a window pane guide in cooperation with said spaced apart profile parts.

8. Terrace glass enclosure as defined in claim 1 wherein at least two stops are provided at different levels, said handles having an operating element the shifting of which brings the cams into an unlocking position out of engagement with the stops.

9. Terrace glass enclosure as defined in claim 8, wherein the operating element is acted on by a spring to cause the cams to be in blocking relation to the stops.

10. Terrace glass enclosure as defined in claim 8, wherein the operating element is a cylindrical part rotatably mounted in a housing of the handle and at the end faces of which the cams are formed.

11. Terrace glass enclosure as defined in claim 10, wherein the cylindrical part has an operating ledge which protrudes outwardly through a slit-shaped opening in the housing, said opening limiting movement of the operating element.

12. Terrace glass enclosure as defined in claim 11, wherein the handle of an outer of said window panes is accessible for operation outwardly of said outer pane, said operating ledge of said handle in an unlocked position thereof being essentialy perpendicular to the outer glass pane.

13. Terrace glass enclosure as defined in claim 11, wherein the handle of an inner of said two window panes extends inward of the inner pane, and the operating ledge of said handle, in an unlocked position of the handle, is essentially parallel to the pane.

14. Terrace glass enclosure as defined in claim 3, wherein the struts carry rollers at their upper side, said rollers being below an outer of said two window panes and serving as supports for an outer of said two window panes should it sag under a snow load.

15. Terrace glass enclosure comprising (a) an arched roof supported at its top by an existing wall and at its bottom by a terrace floor,
(b) said roof being constituted of a plurality of similar arch elements having lateral frame parts adapted to movably guide two glass panes in different planes, said arched roof at its opposite sides being closed off by gable parts each comprising
(c) three gable elements in turn comprising a rectangular basic element and two connecting elements, each connecting element comprising a frame arch shaped to correspond to the arch elements and two mutually perpendicular frame legs, one of which constitutes a leg of the rectangular basic element, said glass panes comprising outer and inner, at least partially overlapping, spaced apart glass panes, the outer glass pane of the arch elements being longer than the inner pane, and a handle for operating the outer pane and having a length greater than the space between said outer and inner glass panes thereby to prevent release of said handle until said inner glass pane is in a position out of the path of said handle, said out of the path position of the inner glass pane comprising a position above a closed position thereof.

16. Terrace glass enclosure according to claim 15, wherein each of said glass panes has a handle at its lower end, each handle having a laterally projecting cam, which either engages or clears stops on the frame parts as a function of the operative condition of the handles.

17. Terrace glass enclosure as defined in claim 16, wherein at least two stops are provided at different levels, said handles having an operating element the shifting of which brings the cams into an unlocking position out of engagement with the stops.

18. Terrace glass enclosure as defined in claim 17, wherein the operating element is acted on by a spring to cause the cams to be in blocking relation to the stops.

19. Terrace glass enclosure as defined in claim 17, wherein the operating element is a cylindrical part rotatably mounted in a housing of the handle and at the end faces of which the cams are formed.

20. Terrace glass enclosure as defined in claim 19, wherein the cylindrical part has an operating ledge which protrudes outwardly through a slit-shaped opening in the housing, said opening limiting movement of the operating element.

21. Terrace glass enclosure as defined in claim 20, wherein the handle of the outer of said window panes is accessible for operation outwardly of said outer pane, said operating ledge of said handle in an unlocked position thereof being essentially perpendicular to the outer glass pane.

22. Terrace glass enclosure as defined in claim 20, wherein the handle of the inner of said two window panes extends inward of the inner pane, and the operating ledge of said handle, in an unlocked position of the handle, is essentially parallel to the pane.

* * * * *